United States Patent
Matlock et al.

(10) Patent No.: US 8,366,367 B2
(45) Date of Patent: Feb. 5, 2013

(54) NUT AND BOLT COVER

(76) Inventors: Brian Matlock, Portland, OR (US); Craig Marquardt, Covington, GA (US)

( * ) Notice: Subject to any disclaimer, the term of this patent is extended or adjusted under 35 U.S.C. 154(b) by 149 days.

(21) Appl. No.: 12/648,967

(22) Filed: Dec. 29, 2009
(Under 37 CFR 1.47)

(65) Prior Publication Data

US 2011/0123293 A1    May 26, 2011

Related U.S. Application Data

(60) Provisional application No. 61/141,525, filed on Dec. 30, 2008.

(51) Int. Cl.
*F16B 37/14* (2006.01)
(52) U.S. Cl. .................. 411/429; 411/372.6
(58) Field of Classification Search .......... 411/429–431, 411/372.5–375, 265–267
See application file for complete search history.

(56) References Cited

U.S. PATENT DOCUMENTS

| | | | | |
|---|---|---|---|---|
| 1,062,039 | A | * | 5/1913 | Schimmel ............... 411/268 |
| 4,659,273 | A | * | 4/1987 | Dudley ................... 411/373 |
| 4,707,035 | A | | 11/1987 | Kondo et al. |
| 4,787,681 | A | | 11/1988 | Wang et al. |
| 4,880,344 | A | * | 11/1989 | Henry et al. ............. 411/374 |
| 4,881,783 | A | | 11/1989 | Campbell |
| 4,884,933 | A | * | 12/1989 | Preusker et al. ......... 411/177 |
| 4,890,967 | A | * | 1/1990 | Rosenbaum ............. 411/377 |
| 4,895,415 | A | | 1/1990 | Stay et al. |
| 4,962,968 | A | | 10/1990 | Caplin |
| 5,031,965 | A | | 7/1991 | Buerger |
| 5,048,898 | A | | 9/1991 | Russell |
| 5,205,614 | A | | 4/1993 | Wright |
| 5,249,845 | A | | 10/1993 | Dubost |
| 5,297,854 | A | | 3/1994 | Nielsen et al. |
| 5,364,213 | A | * | 11/1994 | Teramura ................. 411/431 |
| 5,380,070 | A | | 1/1995 | FitzGerald |
| 5,520,445 | A | | 5/1996 | Toth |
| 6,238,158 | B1 | | 5/2001 | Clements |
| 6,511,132 | B1 | | 1/2003 | Wright |
| 6,629,810 | B1 | * | 10/2003 | Heintges et al. .......... 411/372.6 |

* cited by examiner

*Primary Examiner* — Flemming Saether
(74) *Attorney, Agent, or Firm* — Stoel Rives LLP (57) ABSTRACT

A nut and bolt cover apparatus is preferably made from three pieces. A cover piece may be placed over a nut and may have an adapter piece placed over the cover. An exterior cover may be releasably attached to the adapter piece and may squeeze a portion of the adapter piece as the exterior cover is releasably attached to the adapter. Squeezing the adapter piece preferably compresses the cover piece and causes the cover piece to grip the nut of a nut and bolt assembly while the adapter piece grips the cover piece. Removing the exterior cover may relieve the compression forces causing the adapter piece to grip the cover piece and the cover piece to grip a nut, thus permitting the nut and bolt cover apparatus to be removed.

17 Claims, 7 Drawing Sheets

NUT AND BOLT COVER

RELATED APPLICATION DATA

This application claims priority under 35 U.S.C. §119(e) to U.S. Provisional Application No. 61/141,525 titled "Nut and Bold Cover" filed on Dec. 30, 2008, which is fully incorporated by reference herein.

BACKGROUND

The field of the present disclosure relates to a system or apparatus for covering a nut and bolt assembly. Covers for nut and bolt assemblies are used for a variety of reasons, including protecting nut and bolt assemblies from environmental hazards, preventing tampering with a nut and bolt assembly, and for aesthetic purposes.

A variety of approaches have been taken for securing an apparatus for covering a nut and bolt assembly to the nut and bolt assembly. For example, covering apparatuses have been designed to be incorporated into a lug nut as in U.S. Pat. Nos. 2,018,301 and 4,775,272, to be secured to a bolt protruding past a nut as in U.S. Pat. Nos. 2,095,289, 3,548,704, and 4,824,305, to have a deformable portion that deforms to hold the cover on a nut as in U.S. Pat. No. 4,582,462 and U.S. Pat. No. 4,784,555, and to be secured using adhesives as in U.S. Pat. No. 4,764,070, among other techniques for securing a cover to a nut.

The present inventors have recognized limitations and drawbacks associated with existing apparatuses for covering nut and bolt assemblies. For example, some present apparatuses are not able to remain secured to a nut and bolt assembly after being removed and reinstalled because of wear or loosening parts. Other apparatuses rely on a portion of a bolt or stud to protrude past a nut, which does not always occur. Still other apparatuses require tools or adhesives for installation. The present inventors have also recognized various needs for an apparatus for covering nut and bolt assemblies that does not require tools to install, or that may be uninstalled and reinstalled without losing its ability to stay in place on a nut, or that does not rely on an exposed bolt or stud for securement, singularly or in any combination.

SUMMARY

Embodiments of the present invention may address some or all of the above identified limitations and/or needs, or may address other suitable needs. An exemplary apparatus/system or method for covering a nut and bolt assembly includes a nut cover, an adapter including a structure for releasably attaching an exterior cover to the adapter, and an exterior cover including a reciprocal structure for releasably attaching to the adapter. The exterior cover is preferably designed to apply a compressive force to the nut cover via the adapter when the exterior cover is releasably attached to the adapter.

In a preferred embodiment, installing a nut cover on a nut and bolt assembly involves placing a nut cover, or gripping element, over the nut. An adapter, or force transfer piece, is preferably placed over the cover. An exterior cover, or compression force applying piece, is releasably secured to the adapter. When the exterior cover is releasably secured to the adapter, the exterior cover preferably slides over the adapter to create a compression force on the adapter proximate where the adapter contacts the cover. Preferably, the adapter deforms in a direction substantially orthogonal to the surface of the cover when the exterior cover is installed, thus creating a compression force on the cover with little or no shear forces. In other words, the adapter preferably does not slide with respect to the cover.

Additional aspects and advantages will be apparent from the following detailed description of preferred embodiments, which proceeds with reference to the accompanying drawings.

DETAILED DESCRIPTION OF PREFERRED EMBODIMENTS

Preferred embodiments will now be described with reference to the drawings. While several preferred embodiments are described with reference to a nut and bolt assembly cover used with lug nuts, a practitioner in the art will realize from the description that the principles described are viable to other applications. The described embodiments, as well as other embodiments, have numerous applications where a nut and bolt assembly is covered for protection from an environment likely to damage, discolor, or disfigure the nut and bolt assembly, is covered for aesthetic purposes, or is covered for other suitable reasons. Embodiments may be scaled and adapted to many applications.

Figure 1:
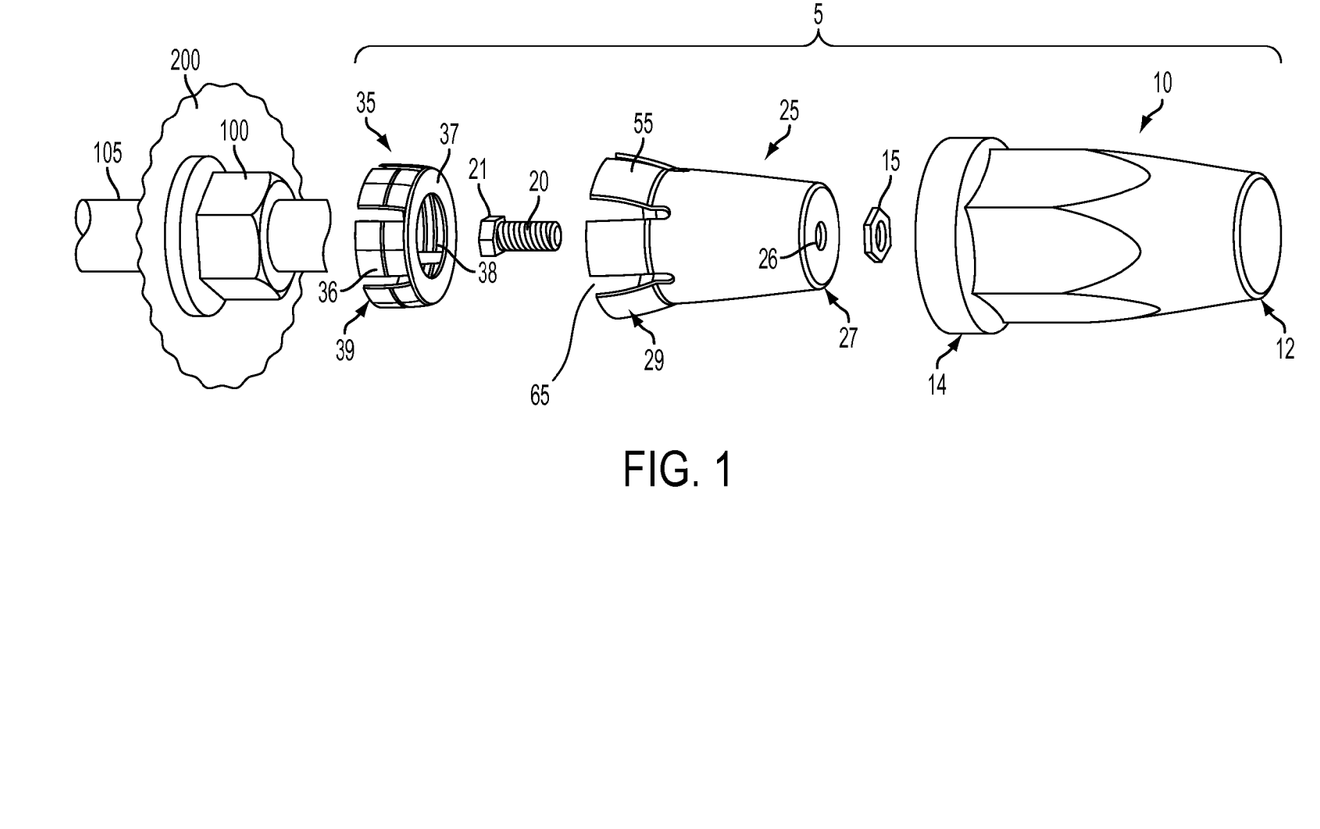
FIG. 1 is an assembly view of a preferred embodiment.
Figure 2:
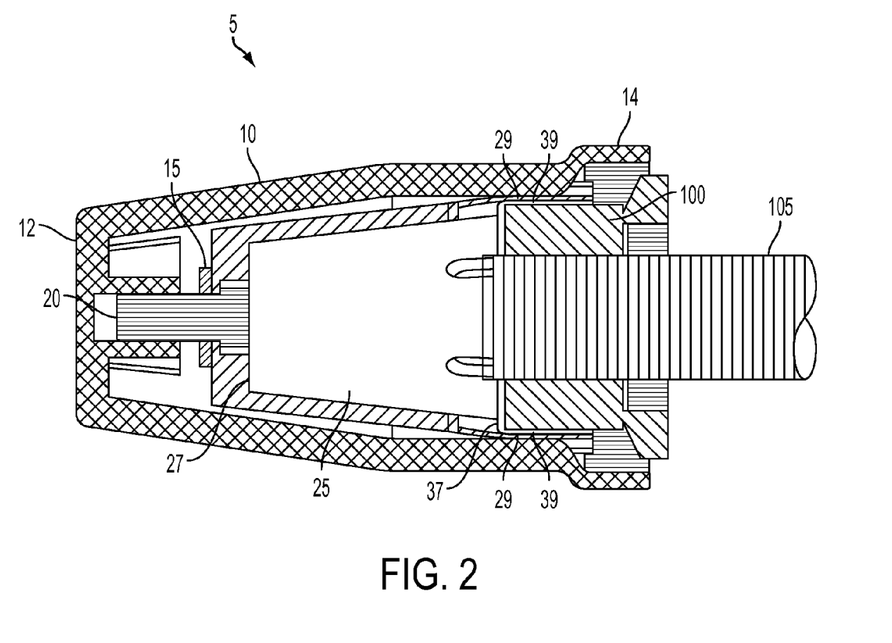
FIG. 2 is a cut away view of the embodiment of FIG. 1 with the components assembled.

FIGS. 1 and 2 illustrate an exemplary nut and bolt including a lug nut 100 used to secure a wheel 200 to a wheel hub (not illustrated for clarity) via threaded wheel studs 105. FIG. 1 is an exploded view of a nut and bolt cover assembly 5 that includes several components, preferably, a nut cover 35, an adapter 25, and an exterior cover 10. In preferred embodiments, the nut cover 35 is placed over the lug nut 100, followed by the adapter 25 and then the exterior cover 10. The exterior cover 10 may secure a decorative hub cap (not illustrated) in place on the wheel hub.

As described in more detail below, attaching the exterior cover 10 to the adapter 25 exerts a compressive force on a nut end 29 of the adapter 25. The compressive force on the nut end 29 of the adapter 25 preferably exerts a compressive force on the nut cover 35 via the nut end 29 as also described below. By compressing the nut end 29 and the nut cover 35, the nut and bolt cover assembly 5 grips the lug nut 100 to remain securely in place.

FIGS. 1-4 illustrate the cover assembly 5 for attaching to a lug nut 100 and wheel stud 105 assembly. Wheel 200 is retained to the wheel hub (not illustrated for clarity) using wheel stud 105 and lug nut 100 as commonly known. A nut cover 35 is placed over the lug nut 100, preferably by slipping the nut cover 35 over the lug nut 100. The nut cover 35 may be pre-shaped to accommodate the lug nut 100, as illustrated in FIG. 1, or may be deformable to readily conform to the contour of the lug nut 100, for example, by using a rubber or soft plastic sleeve. A pre-shaped nut cover 35 may include a ring 37 with tabs 39 projecting from one side. Preferably, a pre-shaped nut cover 35 includes a plurality of extensions, tabs, flares, fingers, or other suitable structure for gripping a nut, where the number of extensions or the like correspond to the number of sides of the nut. For example, a nut cover 35 with six tabs 39 may be used with a hexagonal nut. The tabs 39 may be configured to correspond to the outer surfaces of the nut 100, and may include a nut gripping inside surface 38 and an adapter engaging outer surface 36.

Figure 3:
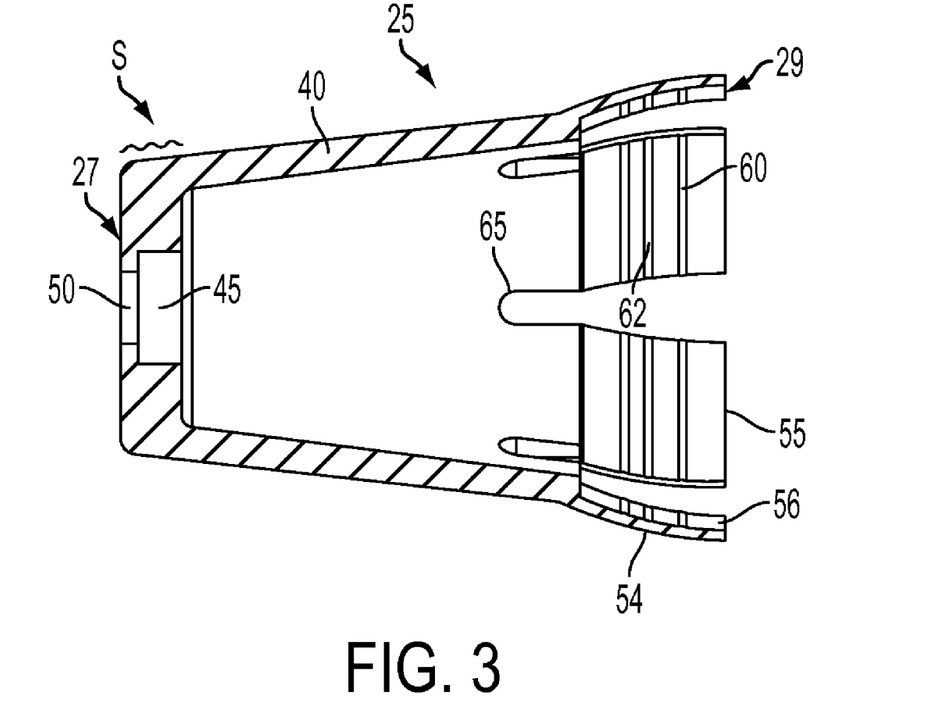
FIG. 3 is a cut away view of the adapter of FIG. 1.
Figure 4:
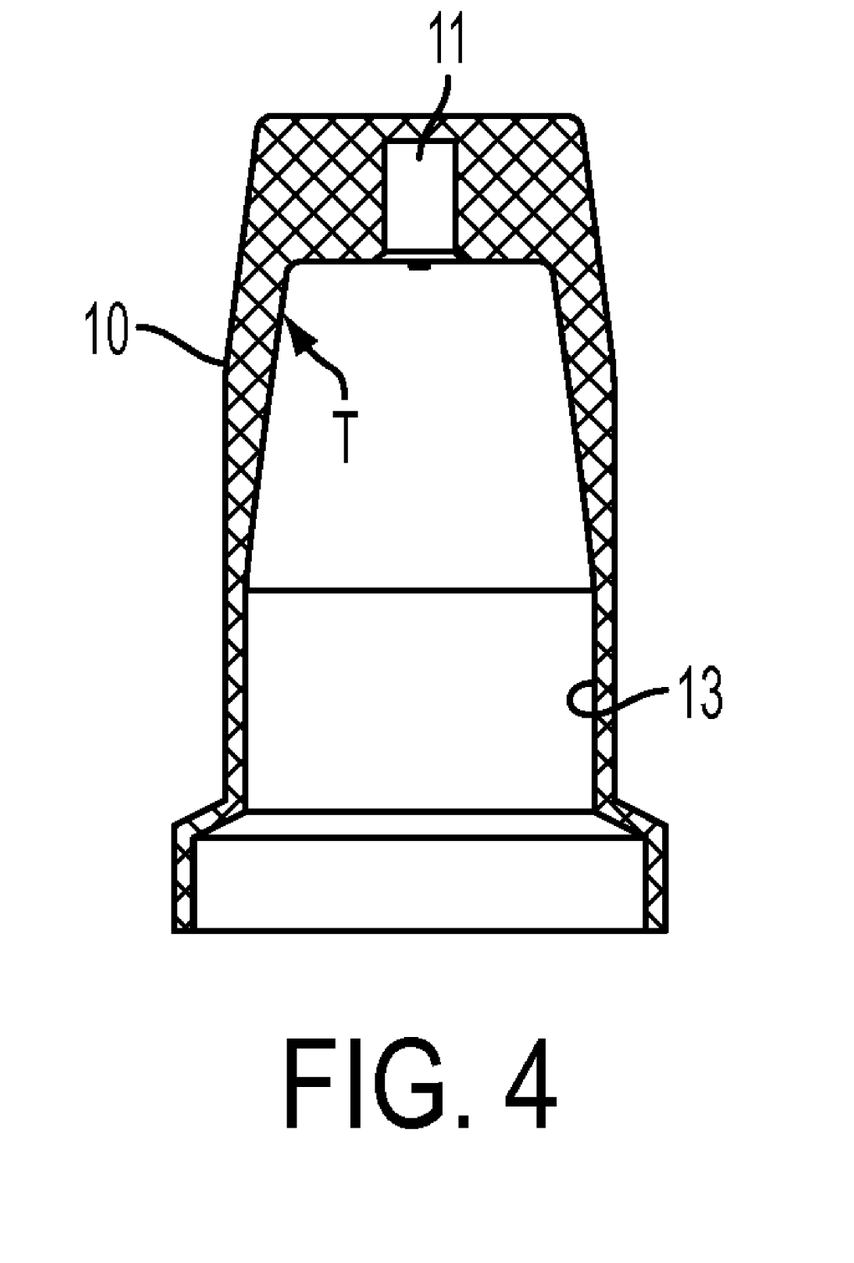
FIG. 4 is a cut away view of the exterior cover of FIG. 1.

The adapter 25 is slipped over the nut cover 35 so that a nut end 29 contacts the nut cover 35. The adapter 25 is preferably shaped in what may be described as a flowerpot as illustrated in FIGS. 1 and 3, but may have any suitable shape, including, but not limited to, a cylindrical shape, a conical shape, or frustoconical shape. The nut end 29 preferably includes an elastically deformable section, for example, a section including adapter tabs 55 separated by slots 65. A substantially cylindrical sidewall 40 extends between the exterior cover end 27 and the nut end 29.

The exterior cover end 27 of the adapter 25 preferably includes an attachment structure for releasably attaching an exterior cover 10 to the adapter 25. For example, a threaded bolt 20 may be held in an aperture 45, 50 (FIG. 3) by a nut 15. In the assembly 5, the bolt 20 is inserted from the inside of the adapter 25 and through the hole 45, 50 (FIG. 3) and then secured in position extending outwards from the closed end of the adapter 25. The bolt 20 may be secured in place by ring nut 15 or a clip or other suitable mechanism, by press fitting the bolt 20 or bold head 21 into the aperture 45 and/or 50, by using a threaded aperture, by using an adhesive, or by welding.

The exterior cover 10 has a generally thimble-shaped structure with open base end 14 and closed tip end 12. The exterior cover is releasably attached to the adapter 25. For example, the tip end 12 of the exterior cover 10 may carry a female threaded receiver 11 (FIG. 4) that threadably engages the bolt 20. A rotational force is imparted to the exterior cover 10 to engage the threaded receiver 11 with the bolt 20. As the exterior cover 10 is releasably attached to the adapter 25, the base end 14 of the exterior cover 10 rotates and moves linearly towards the nut 100 to engage the nut end 29 of the adapter 25 and impart a compressive force. Preferably, the compressive force is created by pressing the elastically deformable section of the nut end 29 towards the nut 100 as the interior surface 13 (FIG. 4) of the exterior cover 10 slides over the nut end 29 of the adapter 25.

The compressive force created by sliding the exterior cover 10 over the adapter 25 acts on the nut cover 35 via the nut end 29. Once installed/assembled, there is preferably no sliding between the surfaces of the nut 100 and the nut cover 35, and no sliding between the surfaces of the nut cover 35 and the adapter 25. For example, there may be a relatively high static coefficient of friction between the lug nut 100 and the nut cover 35 as well as a relatively high static coefficient of friction between the nut cover 35 and the nut end 29 as the exterior cover 10 engages the adapter 25.

Additionally, the exterior surface of the adapter 25 and the interior surface of the exterior cover 10 that contact each other preferably slide relatively easily over each other. For example, the static coefficient of friction between the exterior cover engaging surfaces 54 on the adapter tabs 55 at the nut end 29 of the adapter 25 and the interior surface 13 proximate the base end 14 of the exterior cover 10 is preferably lower than the static coefficient of friction between the lug nut 100 and the nut cover 35 and also lower than the static coefficient of friction between the nut cover 35 and the nut end 29 of the adapter 25. The combined effect of the various static coefficients of friction preferably permits the base end 14 of the exterior cover 10 to slide over the nut end 29 of the adapter 25 without imparting a rotational motion to the adapter 25. Squeezing, but not rotating the adapter 25, may thus provide a compressive force on the nut cover 35 with little or no shear forces acting on the nut cover 35.

By reducing or eliminating shear forces from acting on the nut cover 35, the likelihood that the nut cover will move, or slip, with respect to the lug nut 100 is decreased. Thus, the likelihood of loosening, or causing wear on, the nut gripping surfaces 38 of the nut cover 35 (FIG. 1) or the nut cover gripping surfaces 56 of the adapter 25 (FIG. 3) is reduced which may increase the number of cycles the nut and bolt cover 5 may be removed and replaced without becoming loose.

Once installed, the exterior cover 10 preferably substantially covers the lug nut 100. For example, the exterior cover may contact a surface held in place by the nut and bolt assembly, extend past the bottom of a nut, or may stop short of the bottom of a nut. Extending the exterior cover 10 to contact a surface held in place by the nut and bolt assembly, or to another position, may create a first barrier to impede debris from reaching the lug nut 100. The cover 35 over the lug nut 100 may act as a second barrier to impede debris from reaching the lug nut 100.

The exterior cover 10 is preferably secured to the flowerpot-shaped adapter 25 via a threaded interconnection, such as the one described above, or by some other suitable interconnection. Another exemplary threaded connection may be configured without the bolt 20 by providing male threads, for example, in the region proximate where arrow "S" points in FIG. 3, along the outer surface of the adapter 25. Corresponding female threads may be provided on the exterior cover 10, for example, in the region proximate where arrow "T" points in FIG. 4, along the inner surface 13 of the exterior cover 10 proximate the closed end. Other attaching structures may secure the exterior cover 10 to the adapter 25. For example, a quarter-turn quick connect, a press or interference fit, or other suitable structure may be used.

Many materials and surface finishes may be used to alter the sliding relationship between surfaces, for example, by creating different static coefficients of friction between the various surfaces. The static coefficient of friction ($\mu$) is commonly defined as the ratio of the tangential force (F), that is, a force acting in a direction parallel to a surface, required to cause sliding between the two surfaces divided by the force that is acting perpendicular (N) to the two surfaces. In other words, $\mu=F/N$. Therefore, changing the material used, and/or changing the finish for a surface, for example, but not limited to, texturing a surface by creating dimples, ridges, or roughening; polishing a surface; or other suitable alterations, affect the static coefficient of friction between two surfaces. Modifying the static coefficient of friction using different materials and/or finishes may prevent movement between the nut cover 35 and the lug nut 100, and between the nut cover 35 and the adapter 25. Likewise, altering materials and/or finishes may modify the static coefficient of friction to facilitate sliding movement between the adapter 25 and the exterior cover 10.

One example that may achieve desirable static coefficients of friction between the various surfaces is to make the nut cover 35 from a technically specified rubber ("TSR") with a 60 durometer Shore A hardness, to make the adapter 25 from polypropylene, polycarbonate or a combination of polypropylene and polycarbonate, and to make the exterior cover 10 from acrylonitrile butadiene styrene ("ABS") plastic. Other suitable materials may be used. One advantage of a three piece cover 5 may be that relatively rigid materials are used for the components that releasably attach to create a compression force, while a relatively soft material is used to receive the compression force and grip the nut.

Alternatively, portions of the adapter 25 designed to contact the nut cover 35, such as the nut cover gripping surfaces 56 on adapter tabs 55 (FIG. 3), may include a layer of material such as Santoprene®, natural rubber, or other suitable material to increase the static coefficient of friction between the adapter 25 and the nut cover 35. Alternatively, a gripping structure, such as raised ribs 60 or grooves 62 (FIG. 3), raised dots (not illustrated), dimples (not illustrated), texturing (not illustrated), or other suitable structure may be included on the nut cover gripping surfaces 56. Similar modifications may be made to the portions of the nut cover 35 that contact the lug nut 100. The interior surface 13 (FIG. 4) of the exterior cover 10 may be polished to reduce the static coefficient of friction between the exterior cover 10 and the adapter 25. Likewise, the exterior of the adapter 25 may be polished.

Another manner to control whether two surfaces slip with respect to one another is to modify the isothermal compressibility of the materials. For example, the nut cover 35 may be made from a material with an isothermal compressibility that is greater than the isothermal compressibility of the material for the adapter 25. And, the adapter 25 may be made from a material with an isothermal compressibility similar to the isothermal compressibility of the material for the exterior cover 10. By permitting a portion of the adapter 25 to displace into the nut cover 35 (due to the different isothermal compressibility of the materials), resistance to sliding may result from both the static coefficient of friction between the materials and the physical interference caused by the less compressible adapter 25 displacing into the more compressible nut cover 35.

Additionally, the outside of the exterior cover 10 may be electroplated with chrome, or otherwise suitably altered, to provide environmental protection, for aesthetic purposes, or for other purposes.

Figure 5:
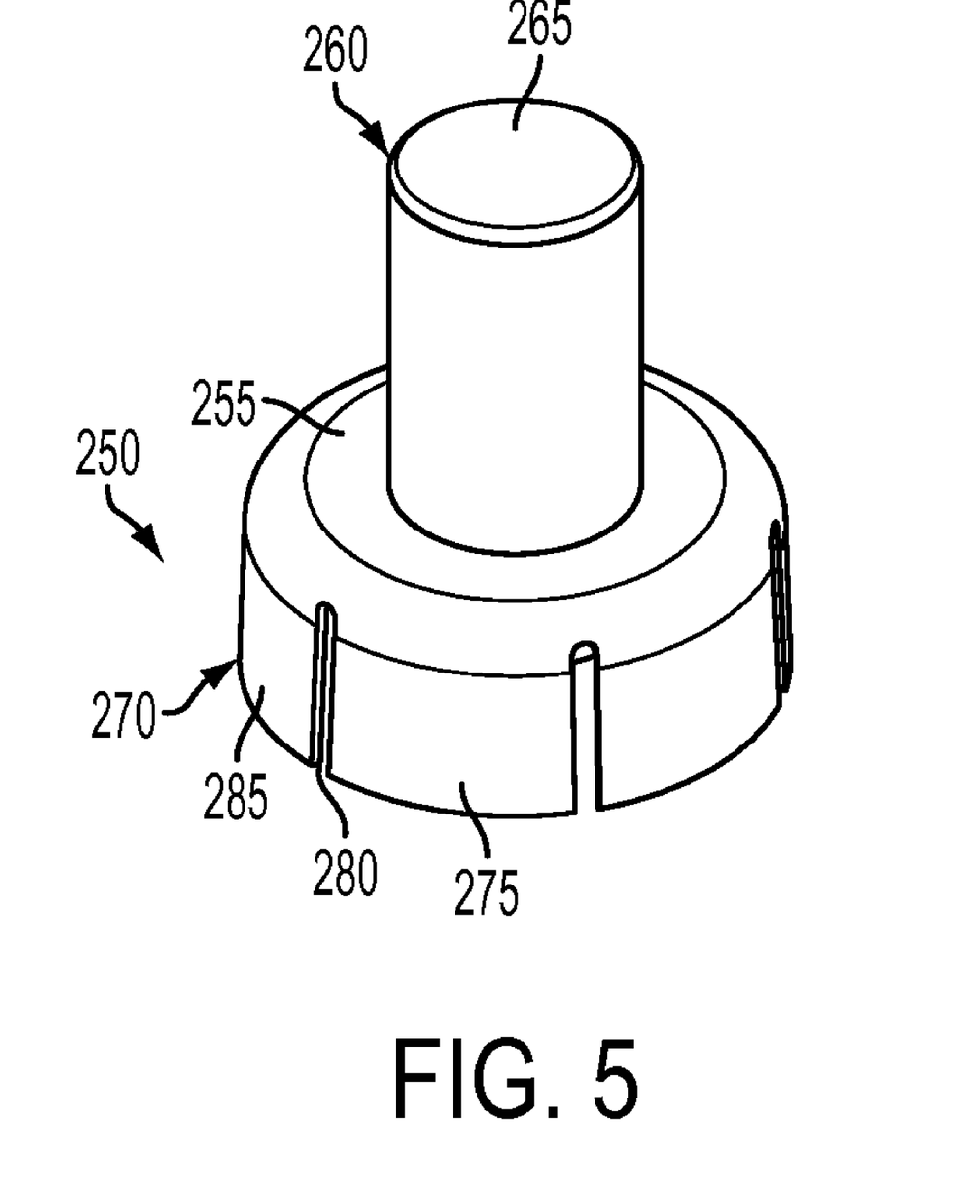
FIG. 5 is a top front isometric view of an adapter for another embodiment.
Figure 6:
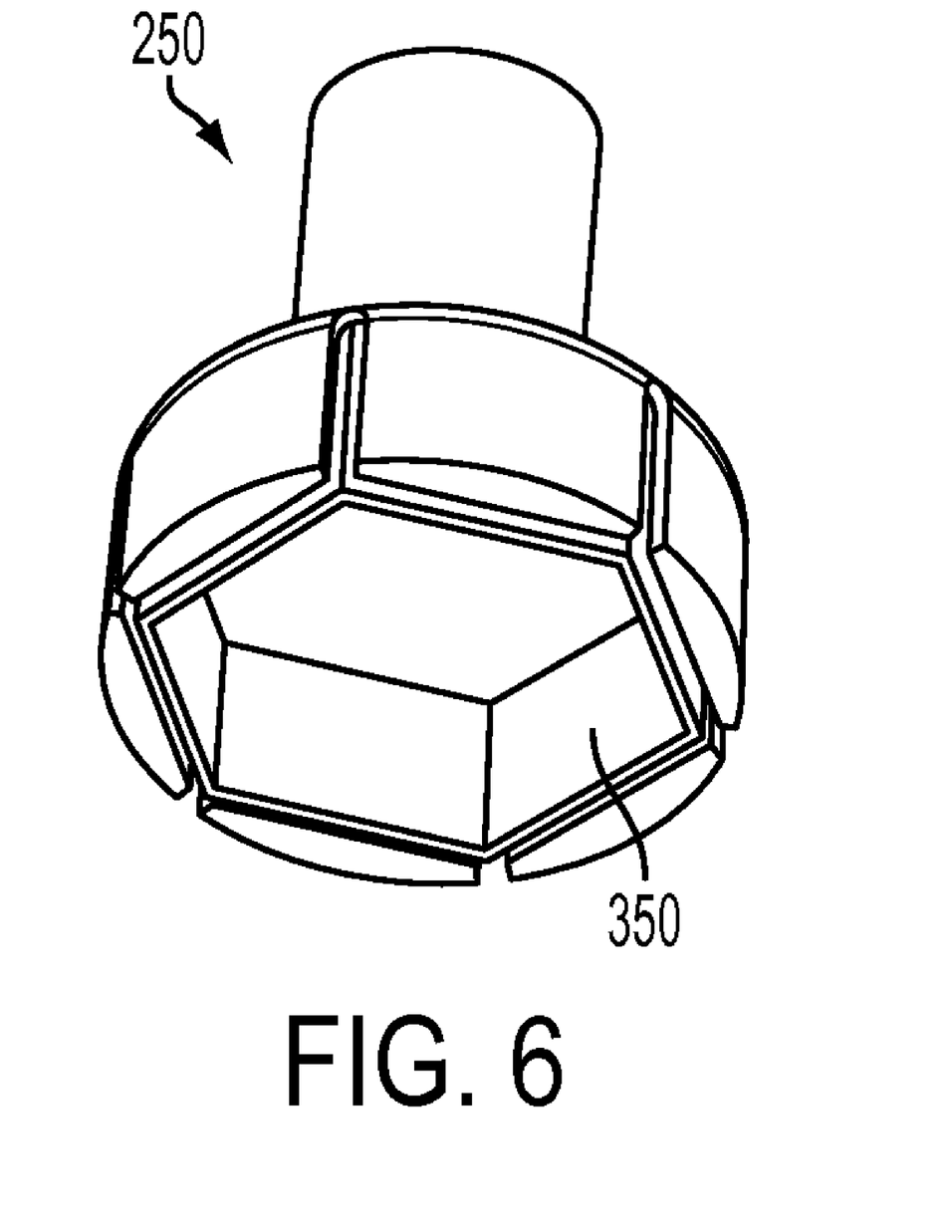
FIG. 6 is a bottom isometric view of the adapter of FIG. 5 illustrating the adapter and a cover placed over a nut, but with the nut removed for clarity.
Figure 7:
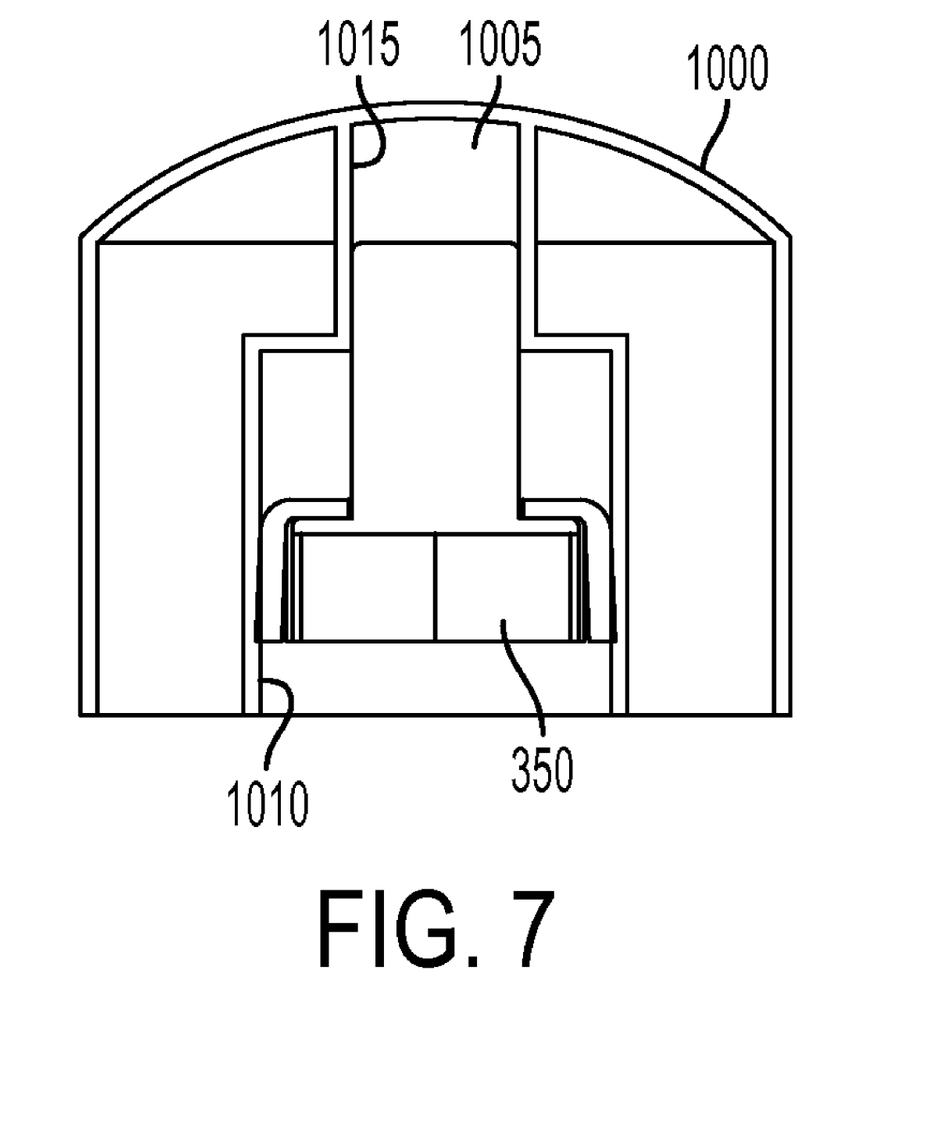
FIG. 7 is a cut away view of the adapter and cover of FIG. 6 placed over a nut and with an exterior cover releasably attached to the adapter, but with the nut removed for clarity.

Alternate embodiments may shape components including a nut cover, an adapter, and an exterior cover differently. For example, FIGS. 5-7 illustrate an embodiment of a nut cover 350 having an elastically deformable sleeve. The nut cover 350 may be made from TSR with a 60 durometer Shore A hardness, other TSR, polychloroprene, or other suitable material. Preferably, the nut cover 350 is readily deformable to accommodate the shape of a nut (nut not illustrated in FIGS. 6-7 for clear viewing of how the nut cover 350 may deform).

The adapter 250 includes a ring 255 on an upper surface. The exterior cover end 260 includes an attaching structure 265 extending from the ring 255. The attaching structure 265 may include a post 260 sized to create an interference fit with a sidewall 1015 of a recess 1005 in the exterior cover 1000, or may include a threaded post (not illustrated), a post bearing a snap fit structure (not illustrated) such as a ridge sized to fit into a groove in the sidewall 1015 (or vice versa), or other suitable structure.

The adapter nut end 270 includes a number of tabs 275 for engaging the nut cover 350. The tabs 275 preferably extend from the ring 255 in a direction opposite the attaching structure 265. Preferably, each tab 275 is arranged at an angle with respect to a tangent to the edge of the ring 255, for example a 3 degree angle. For example, the end of the tab 275 that is distal from the ring 255 may be farther from a central axis of the ring 255 than the end of the tab 275 that is proximate the ring 255. Setting the tabs 275 at an angle may facilitate creating a compression force on the nut end 270 of the adapter 250 when the exterior cover 1000 is releasably attached. Other suitable arrangements may be used, such as increasing the thickness of each tab 275 in a direction extending away from the ring 255, for example, or combining increasingly thick tabs with angularly offsetting the tabs.

Each tab 275 preferably includes a nut cover engaging surface 280 and an opposing exterior cover engaging surface 285. Nut cover engaging surfaces 280 are preferably designed to reduce the likelihood that a nut cover engaging surface 280 will slide with respect to the nut cover 350. On the other hand, exterior cover engaging surfaces 285 are preferably designed to facilitate sliding between an exterior cover engaging surface 285 and the interior 1010 of the exterior cover 1000. The interior 1010 of the exterior cover 1000 may also be designed to facilitate such sliding, for example, by polishing.

The exterior cover 1000 is illustrated with a recess 1005 sized to create an interference fit with the attaching structure 265. As previously discussed, other suitable arrangements for releasably attaching the exterior cover 1000 to the adapter 250 may be used, such as those given above, by arranging matching male and female threads on the exterior cover engaging surfaces 285 and the interior surface 1010, or other suitable releasably attaching structures.

Referring to FIG. 1, a decorative lug nut and bolt cover system 5 may comprise a nut cover means 35 for gripping a lug nut 100; an adapter means 25 for engaging the nut cover means 35; and an exterior cover means 10 for (a) releasably attaching to the exterior cover end 27 of the adapter means 25, (b) compressing the nut end 29 of the adapter means 25, and (c) applying a compression force to the nut cover means 35 via compressing the nut end 29 of the adapter means 25.

Referring to FIGS. 5-7, a decorative lug nut and bolt cover system may comprise a nut cover means 350 for gripping a lug nut; an adapter means 250 for engaging the nut cover means 350; and an exterior cover means 1000 for (a) releasably attaching to an exterior cover end 260 of the adapter means 250, (b) compressing a nut end 270 of the adapter means 250, and (c) applying a compression force to the nut cover means 350 via compressing the nut end 270 of the adapter means 250.

It will be obvious to those having skill in the art that many changes may be made to the details of the above-described embodiments without departing from the underlying principles of the invention. The nut cover, adapter, and/or exterior cover may take a variety of shapes and sizes to create a compressive force on the nut cover to grip a nut. The scope of the present invention should, therefore, be determined only by the following claims.

The invention claimed is:

1. A decorative nut and bolt cover system comprising:
   a nut cover for gripping a nut;
   an adapter having an exterior cover end and a nut end, the nut end constructed and arranged to encompass and engage the nut cover; and
   an exterior cover having a tip end and a base end, the tip end of the exterior cover constructed and arranged to be releasably attached to the exterior cover end of the adapter, the base end of the exterior cover constructed and arranged to compress the nut end of the adapter when the tip end of the exterior cover is releasably attached to the exterior cover end of the adapter, the nut end of the adapter constructed and arranged to apply a compression force to the nut cover when the tip end of the exterior cover is releasably attached to the exterior cover end of the adapter, the base end of the exterior cover constructed and arranged to substantially cover a nut engaged by the nut cover.

2. A nut and bolt cover according to claim 1, wherein the nut cover and the adapter are constructed with a static coefficient of friction between the nut cover and the adapter that is greater than a static coefficient of friction between the adapter and the exterior cover.

3. A nut and bolt cover according to claim 1, wherein the isothermal compressibility for the nut cover is greater than the isothermal compressibility for the adapter nut end.

4. A nut and bolt cover according to claim 1, wherein the nut cover includes an elastically deformable sleeve.

5. A nut and bolt cover according to claim 1, wherein the nut cover includes a ring having a plurality of tabs extending from one side of the ring, each tab including a nut gripping surface and an opposing adapter engaging surface.

6. A nut and bolt cover according to claim 5, further comprising a gripping structure on each nut gripping surface.

7. A nut and bolt cover according to claim 5, wherein the nut cover further includes a central axis, and, for each tab, the adapter engaging surface proximate the ring is located closer to the nut cover central axis than the adapter engaging surface located distal from the ring when the exterior cover is not releasably attached to the adapter.

8. A nut and bolt cover according to claim 7, wherein a thickness of each tab increases in a direction away from the ring.

9. A nut and bolt cover according to claim 1, wherein the adapter includes a substantially cylindrical sidewall extending between the exterior cover end and the nut end; and
the nut end includes a plurality of adapter tabs for engaging the nut cover, the adapter tabs extending from the sidewall, and each adapter tab including a nut cover engaging surface and an opposing exterior cover engaging surface.

10. A nut and bolt cover according to claim 9, wherein the adapter further includes a central axis, and, for each adapter tab, the exterior cover engaging surface proximate the sidewall is located closer to the adapter central axis than the exterior cover engaging surface located distal from the sidewall when the exterior cover is not releasably attached to the adapter.

11. A nut and bolt cover according to claim 10, wherein a thickness of each adapter tab increases in a direction away from the sidewall.

12. A nut and bolt cover according to claim 9, wherein the adapter exterior cover end includes an attaching structure extending from the exterior cover end.

13. A nut and bolt cover according to claim 12, wherein the attaching structure includes a threaded post; and
wherein the exterior cover tip end carries a threaded receiver constructed and arranged to threadably engage the threaded post.

14. A nut and bolt cover according to claim 12, wherein the tip end of the exterior cover comprises a recess having a sidewall; and
wherein the attaching structure includes a post, the post being sized to create an interference fit with the sidewall of the recess of the tip end of the exterior cover.

15. A nut and bolt cover according to claim 1, wherein:
the adapter includes a ring;
the adapter exterior cover end includes an attaching structure extending from the ring; and
the adapter nut end includes a plurality of tabs for engaging the nut cover extending from the ring in a direction opposite the attaching structure, each tab including a nut cover engaging surface and an opposing exterior cover engaging surface.

16. A nut and bolt cover according to claim 15, wherein the attaching structure includes a threaded post; and
the exterior cover tip end carries a threaded receiver constructed and arranged to threadably engage the threaded post.

17. A nut and bolt cover according to claim 15, wherein the tip end of the exterior cover comprises a recess having a sidewall; and
wherein the attaching structure includes a post, the post sized to create an interference fit with the sidewall of the recess of the tip end of the exterior cover.

\* \* \* \* \*